United States Patent

Sakuraba et al.

[11] Patent Number: 5,862,332
[45] Date of Patent: Jan. 19, 1999

[54] METHOD OF DATA PASSING IN PARALLEL COMPUTER

[75] Inventors: Taketoshi Sakuraba, Sagamihara; Masaaki Iwasaki, Tachikawa; Masahide Sato, Kawasaki, all of Japan

[73] Assignee: Hitachi, Ltd., Tokyo, Japan

[21] Appl. No.: 766,466

[22] Filed: Dec. 12, 1996

[30] Foreign Application Priority Data

Dec. 22, 1995 [JP] Japan .................................. 7-350295

[51] Int. Cl.[6] .................................................. G06F 15/16
[52] U.S. Cl. .............................. 395/200.49; 395/800.15; 395/727
[58] Field of Search ................ 395/200.47, 200.48, 395/200.49, 200.58, 200.59, 200.61, 200.65, 200.72, 200.74, 200.75, 200.31, 200.32, 200.33

[56] References Cited

U.S. PATENT DOCUMENTS

| | | | |
|---|---|---|---|
| 5,325,524 | 6/1994 | Black et al. | 707/10 |
| 5,426,427 | 6/1995 | Chinnola et al. | 340/827 |
| 5,459,837 | 10/1995 | Caccavale | 395/200.56 |
| 5,628,011 | 5/1997 | Ahamed et al. | 707/10 |

OTHER PUBLICATIONS

Implementing Location Independent Invocation Andrew P. Black and Yeshayahu Artsy, IEEE (1989).

Roman Zajcew, et al. "An OSF/1 UNIX for Massively Parallel Multicomputers" Proceeding of the Winter 1993 USENIX Conference, Jan. 25, 1993, pp. 449–468.

*Primary Examiner*—Dung C. Dinh
*Assistant Examiner*—Hieu C. Le
*Attorney, Agent, or Firm*—Antonelli, Terry, Stout & Kraus, LLP

[57] ABSTRACT

In response to the issue of a request for processing long data from an application node to a server A, the server A sends a message requesting a server B for the processing of the long data. The server B requests the application node to transmit the long data to the server B by using a message, and receives the long data directly from the application node without passing through the server A. As a result, the overhead caused by transferring the long data from a server to a server of another node is eliminated, and the load of the network is reduced.

12 Claims, 4 Drawing Sheets

METHOD OF DATA PASSING IN PARALLEL COMPUTER

BACKGROUND OF THE INVENTION

The present invention relates to a parallel computer, and a computer cluster system, and in particular, to a method of efficient data passing between nodes.

The parallel computer is a computer system configured for the purpose of obtaining a result in short time by coupling a plurality of computing nodes by a high speed network, and by dividing one problem and computing simultaneously on the plurality of nodes. In such a computation, since the performance of the system is affected to a great extent by the processing performance of each node as well as the performance of the network which connects between the nodes, the parallel computer is provided with an especially equipped high speed network.

On the other hand, there is another computer system called as a computer cluster which is configured to use independent computers as the computing nodes and to use a general purpose local area network (LAN) as the network, and to perform similar parallel computation. The computer system configured as mentioned above has a high capability of operation, and when the scale of the problem is small, practical parallel computation is possible even when the network operates more or less at low speed.

Hereinafter, "parallel computer" refers to the above-mentioned parallel computer, and computer cluster. The computing node is described simply as a node. When viewed from a certain node, this node itself is called as a local node. Also, when viewed from a certain node, nodes within the parallel computer other than the local node are called as the other nodes, or remote nodes.

The control of cooperation between the nodes in the parallel computer is called as message passing between the nodes. In the message passing, control information, data used for computation, data of computed result, or file data or the like is delivered and received between the nodes through the network. Accordingly, an operating system (OS) which controls each node has a message passing function as a basic function. The message passing can be utilized by an application or the OS itself.

The role performed by each node of the parallel computer is not necessarily uniform. For example, a device physically connected to a node differs sometimes for each node, and thus, the role of the node differs necessarily. Furthermore, it is usual to distinguish a node performing the control of the system from a node exclusively performing the computation.

An example of such a parallel computer is disclosed in a document by Zajcew, et al. entitled "An OSF/I Unix for Massively Parallel Multicomputers" (Proceedings of the Winter 1993 USENIX Conference, pp 449 to 468).

In this document, an OS called as a kernel operates on each node. The kernel abstracts the message passing by a concept called as a port. The port is one kind of a message queue, and when the kernel sends a message to the port, this message is enqueued in the port. Also, when the kernel assigns this port and requests for a reception of a message, it is possible to receive the message enqueued in this port. In this manner, the kernel on each node can indirectly specify a node of a receiving party by the port.

Moreover, in the document mentioned above, a control program called as a server is operated on the kernel. The server is activated by a specific node called as a server node, and performs control such as to activate an application on each node. Furthermore, for a node having a disk device connected thereto, a file server is activated, and a file access service is performed. Also, for a node provided with a device for an external network (not an internal network which connects between nodes) for communication with other systems, a communication server is activated, and takes charge of an external communication function.

SUMMARY OF THE INVENTION

As described above, the parallel computer is controlled by a plurality of servers, however, as the number of nodes increases, the load of the servers is increased, and this becomes a bottleneck for the performance of the system. To solve this problem, it becomes necessary to further divide the function of the servers and to divide the range of control.

As a result, the plurality of servers are operated linked with each other, and one service request of the application is processed by the plurality of servers. Consequentry, in order to process a service request issued to a certain server, it occurs frequently that the server issues another request for execution of the service to another server.

In the computer system as mentioned above, the message passing between nodes which is performed to process one service request by the application causes the message passing to be performed among much more nodes as compared with the prior art wherein the message passing is performed between two nodes, and thus, the load of the network is increased.

In particular, long data is needed to process a service request, and when this long data is delivered and received between the nodes, the load of the system increases significantly.

Furthermore, when a plurality of servers are operated linked each other, long data is transferred between the servers a plurality of times for processing the service request, and a processing time of the service is increased and the harmful influence due to the division of the servers becomes significant.

An object of the present invention is, in the parallel computer system, to provide a data passing method which solves the increase of the network load due to the transfer of the long data between the servers, and at the same time, solves the increase of the service processing time.

In order to achieve the object, in the present invention, in a first processing system, a message containing information for assigning data which is transferred to a third processing system is prepared and the message is sent to a second processing system which controls the first processing system. And in the second processing system, in order to request the third processing system to perform an associated processing of the above-mentioned data, a message containing information for assigning the above-mentioned data is prepared, and this prepared message is sent to the third processing system from the second processing system. Next, in the third processing system, on the basis of the message sent from the second processing system, a message containing information for assigning the abovementioned data or a part of this data is prepared, and this message is sent to the first processing system. As a result, the first processing system, in response to the message sent from the third processing system, transfers the above-mentioned data or a part of this data assigned in the message sent from the third processing system to the third processing system.

In another aspect, in a first processing system, a message containing information for assigning data which is transferred to third and fourth processing systems is prepared and the message is sent to a second processing system which controls the first processing system, and in the first processing system, the above-mentioned data is placed in a preserved state. And in the second processing system, a message which informs the first processing system of the number of processing systems which are requested for an associated processing of the above-mentioned data existing in the first processing system is prepared, and this message is sent to the first processing system. As a result, the first processing system, on the basis of the message sent from the second processing system, holds the number of processing systems which are requested for the associated processing. On the other hand, in the second processing system, messages containing information assigning the above-mentioned data for requesting third and fourth processing systems to perform the associated processing are prepared, and the respective messages are sent to the third and fourth processing systems. Next, in the third and fourth processing systems, based on the respective messages sent from the second processing system, a message containing information for assigning the above-mentioned data or a part of this data for the first processing system is prepared, and the message is sent to the first processing system. As a result, in the first processing system, in response to the messages respectively sent from the third and fourth processing systems, the above-mentioned data or the part of this data assigned assigned in the messages is transferred to the third and fourth processing system. Thereafter, in the first processing system, on the basis of the number of the systems for performing the associated processing, which number being held in the first processing system, it is decided whether or not to send the data in response to a message requesting for the data from the third processing system or the fourth processing system. When it is decided that the data is not sent, the preservation of the data is stopped.

In still another aspect, the first processing system, in accordance with a context which differs from a context for sending a message requesting the second processing system to process the data, receives a data request message from the third processing system, and sends the data to the third processing system.

DESCRIPTION OF THE PREFERRED EMBODIMENTS

Hereinafter, embodiments of the present invention will be explained with reference to the drawings.

Figure 1:
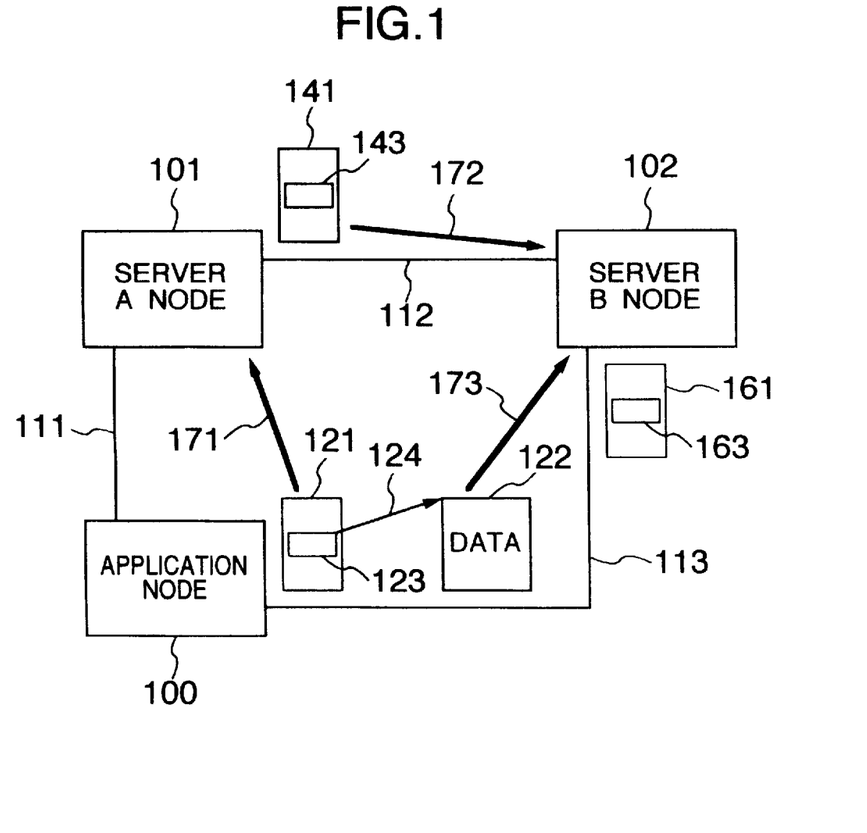
FIG. 1 is a block diagram showing a flow of a message in the present invention.

FIG. 1 is a block diagram showing a flow of a message realized by the present invention.

Boxes 101, 102, and 100 respectively show nodes in which server A, server B, and application are operated. Connections 111, 112, and 113 respectively show channels between these boxes. It is needless to say that these channels are not required to physically and directly connect between the nodes, and various forms may be adopted.

Here, the application node 100 issues a processing request of its internal data to the server nodes, however, the actual data transfer for the data processing is started by a server node which actually received the processing request, for example, by the server A node 101. In other words, the data transfer is executed under the control of the server node.

A box 121 represents a message which is transferred to the server A node 101, and the arrow 171 indicates that the message 121 is transmitted to the server A node 101 from the application node 100 through the channel 111.

A box 141 represents another message for a service request caused by the message transmission 171, and the arrow 172 indicates that the message 141 is transmitted to the server B node 102 from the server A node 101 through the channel 112.

A box 122 represents long data following the message 121, and the arrow 173 indicates that the long data 122 is transmitted on the basis of the message 141 to the server B node 102 from the application node 100 through the channel 113.

A program operated on the application node 100 prepares the message 121 at the time of requesting the server A 101 for a service relating to the long data 122. The message 121 does not include the content itself of the long data 122, however, includes assigning information 123 for assigning the long data 122.

This assigning information 123 for the long data, as shown by the arrow 124, assigns the long data 122. Furthermore, the assigning information 123 for the long data includes sufficient information to assign the long data 122 not only in the inside of the application node 100 but also in the server A node 101 and server B node 102.

In the present invention, it is assumed that when the message 121 is transmitted to the server A node 101 from the application node 100, a program of the server A node 101 which received the message 121 requests the server B for an auxiliary service in order to process the message 121 and the long data 122 which accompanies the message 121. Accordingly, the server A node 101 prepares the message 141 by the above-mentioned program.

In the message 141, there is included the assigning information 123 for the long data obtained from the received message 121, or an assigning information 143 for the long data, which includes information equivalent to the assigning information 123.

In the server B node 102, in order to process the message 141, by using the assigning information 143 for the long data, prepares a message 161 to request the application node 100 for a transfer of the long data 122 to the server B node 102.

The message 161 contains the assigning information 143 for the long data, or an assigning information 163 for the long data including information equivalent to the assigning information 143. The assigning information 163 for the long data inherently includes information equivalent to the long data assigning information 123 prepared in the application node 100, and assigns correctly the long data 122 in the application node 100.

In the application node 100, upon receiving the message 161, transmits to the server B node 102 the long data 122 which is assigned by the assigning information 163 for the long data in the message 161.

Figure 2:
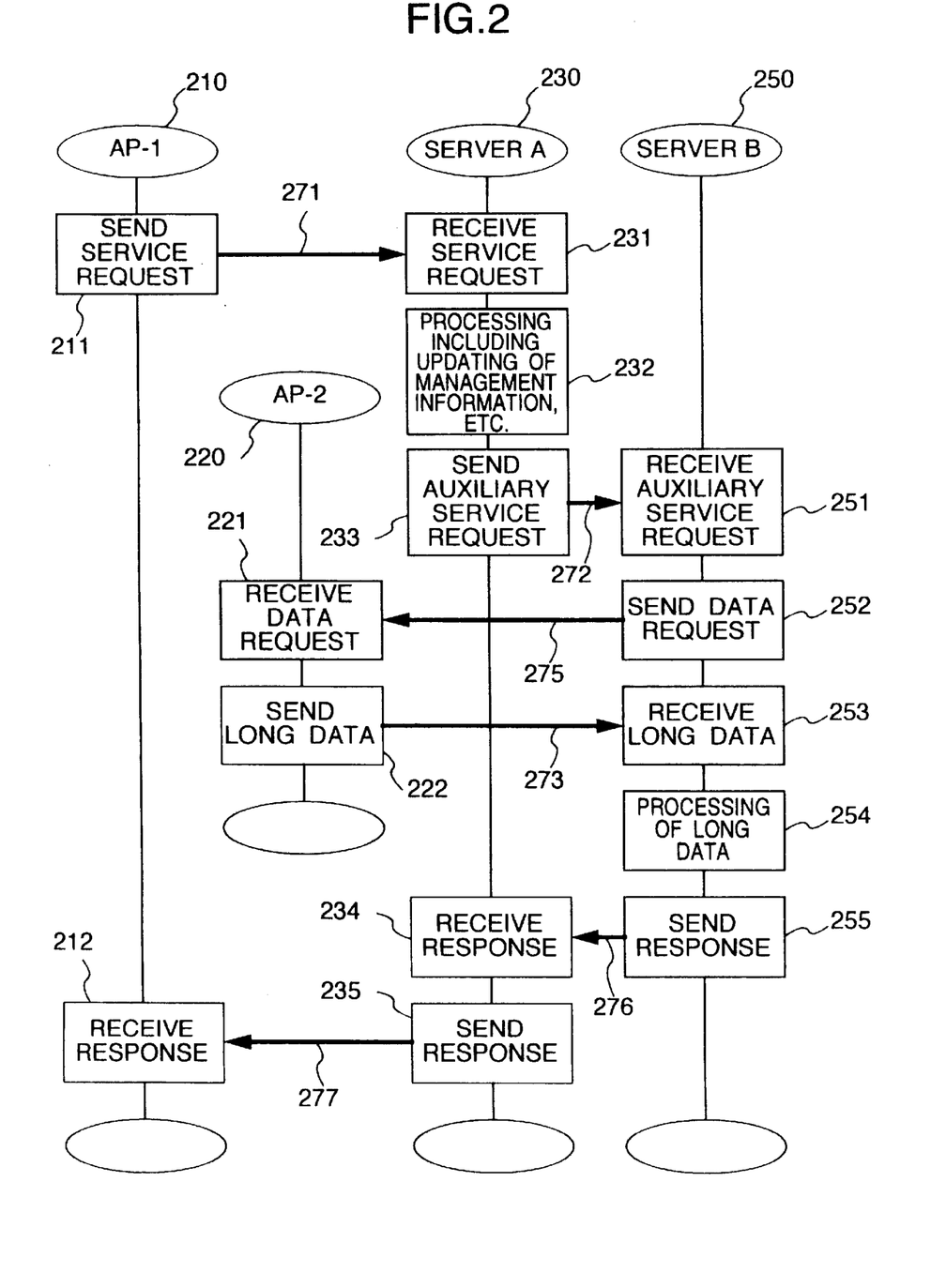
FIG. 2 is a flow chart for explaining a first embodiment of a transfer processing of long data.

FIG. 2 is a flow chart explaining the processing mentioned above.

The reference numerals 210 and 220 show flows of processings performed in the application node 100. The reference numerals 230 and 250 show flows of processings respectively performed in the server A node and the server B node.

Both the processings shown by 210 and 220 are executed in the application node 100. However, the processings shown by 210 and 220 are executed respectively under independent contexts, and thus, shown as different processing flows.

In the application node 100, in step 211, the message 121 is prepared, and it is transmitted to the server A node.

Subsequently, in step 212, a response message to the transmitted message is waited for. The arrow 271 corresponds to the arrow 171 in FIG. 1, and it represents the delivery of the message 121.

In the server A node 101, in step 231, the message mentioned above is received.

In step 232, the processing of the message is performed in the server A. This processing includes other than interpretation of the contents of the message, updating of management information and the like.

In step 233, the message 141 is prepared, and makes a request for an auxiliary service to the server B node 102. The arrow 272 corresponds to the arrow 172 in FIG. 1, and it represents the delivery of the message 141.

Next, in step 234, in the server A node 101, a response message to the transmitted message to be received from the server B node 102 is waited for.

In the server B node 102, in step 251, the message 141 is received.

In order to perform the requested auxiliary service, in the server B node 102, in step 252, the message 161 is prepared, and it is transmitted to the application node 100.

Next, in step 253, in the server B node 102, the long data 122 which will be transmitted as a response to the transmitted message is waited for. The arrow 275 indicates the delivery of the message 161.

In the application node 100, in step 221, the message 161 is received.

In step 222, in the application node 100, the long data 122 requested by the long data assigning information 163 which is contained in the message 161 is recognized, and this long data is transmitted to the server B node 102. The arrow 273 indicates the transmission of the long data.

In the server B node 102, in step 253, the long data is received.

In step 254, in the server B node 102, the processing using the long data is performed. The processing using the long data includes, for example, storage of the data in a disk, transmission of the data to a network, or retrieval of contents of the data, and the like.

In step 255, in the server B node 102, a message for reporting the result of the processing is transmitted to the server A node 101. The arrow 276 indicates this message transmission.

In the server A node 101, in step 234, the message is received.

After performing the processing based on the result, in step 235, in the server A node 101, a message reporting the result of the service requested by the message 121 is transmitted to the application node 100. The arrow 277 indicates this message transmission.

In the application node 100, in step 212, the message mentioned above is received.

In the processing mentioned above, the transfer of the long data 122 to the server B node 102 from the application node 100 is performed directly to the server B node 102. As described above, in the present invention, after the long data 122 has been transferred to the server A node 101, there is no need to transfer the long data anew from the server A node 101 to the server B node 102.

As described above, in the present invention, in the parallel computer, the overhead of transmitting the long data can be reduced, and as a result, a service processing time for the processing request can be reduced. Furthermore, since the unnecessary transfer processing of the long data is not performed, the load of the network is reduced.

The processing flow of the present invention is described in the foregoing, and it is possible to omit the following processing.

If there is no need to receive the result of the service requested in step 211, the steps 212 and 235 are unnecessary.

Furthermore, if there is no need to receive the result of the service requested in step 233, the steps 234 and 255 are unnecessary.

There is another method in which the reception processing 221 and transmission processing 222 are performed by a context different from that used in the transmission of the message 121 in FIG. 1. In this case, the processing steps 221 and 222 may be inserted between the processing steps 211 and 212.

During the period from step 211 to step 222, it is necessary to preserve the contents of the long data 122. To this end it is controlled in which, for example, the contents of the long data 122 is not updated, or a copy of the long data 122 is preserved. When such a control is performed, taking the opportunity of receiving the fetching request of the long data 122 in step 222, the preservation of the long data 122 is released.

Figure 3:
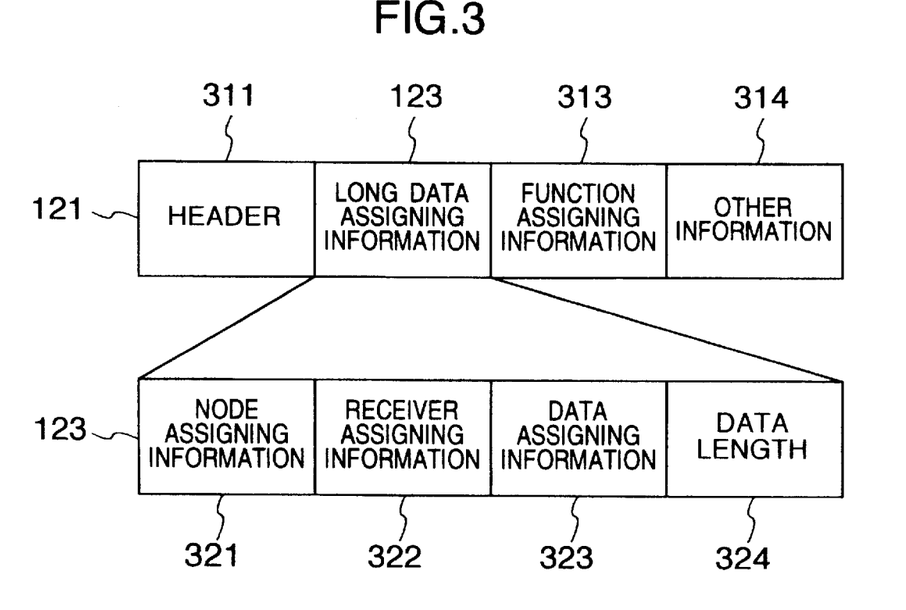
FIG. 3 is a diagram showing a structure of a service request message.

FIG. 3 shows the contents of the message 121 in one embodiment of the present invention.

The message 121 is comprised of a header field 311, long data assigning information field 123, function assigning information field 313, and a field 314 for storing other information.

The long data assigning information field 123 is comprised of a node assigning information field 321, receiver assigning information field 322, data assigning information field 323, and data length field 324.

The header field 311 contains information indicating to which program this message 121 is to be sent, which program sent this message, and other information needed for communication. The information of the destination of the message may be such information which indirectly assigns a message queue.

The long data assigning information 123 is required to have sufficient information which enables to know which data of the nodes is being assigned from which node. For this purpose, there is the node assigning information. For example, if the node number is defined globally on the network, the node number may be used as the node assigning information. Furthermore, if the system allows to identify the node by the coordinate on the network, the coordinate may be used as the node assigning information.

Furthermore, generally, a plurality of programs are operating on one node, and the long data assigning information 123 is required to have sufficient information which enables to know to which program the request is to be issued in order to fetch the long data 122. For this purpose, the receiver assigning information 322 is provided.

For example, there is a method of indirectly assigning a receiving program by assigning a port which is used in the document mentioned as the prior art. As the receiving program, there is a context which issued a first service request among application programs, another independent context, or a context within an OS, and in some cases there is a possibility that an OS itself becomes the receiving program. When the OS becomes the receiving program, it is necessary that the OS preserves the long data 122.

As the data assigning information 323, for example, an address within a virtual address space which is determined by assigning a program, or an equivalent thereto may be used. If a receiving party is different for each long data, since it is possible to assign data solely by the receiver assigning information 322, the data assigning information 323 is not necessarily needed.

The data length field 324 determines the length of the long data 122.

When the data length is managed within the application node 100 so that the data length can be ascertained from the data assigning information 323, the data length field 324 is not necessarily needed. However, it is better to include the data length field 324 in order to achieve the optimization in which a buffer for receiving the long date is appropriately managed by knowing the length of the long data in the server B node 102.

Figure 4:
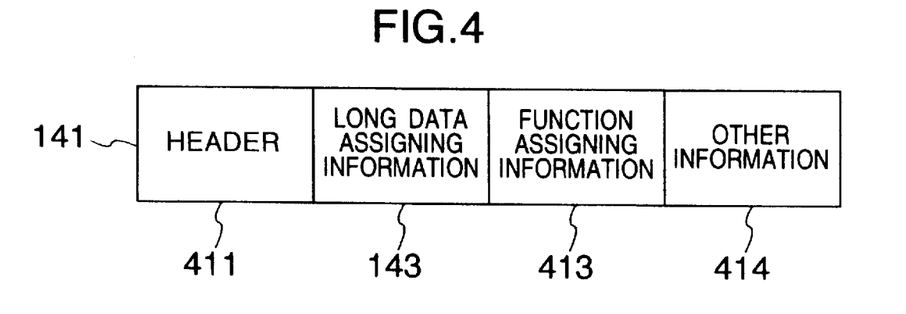
FIG. 4 is a diagram showing a structure of an auxiliary service request message.

FIG. 4 shows the contents of the message 141 in one embodiment of the present invention.

The message 141 from the server A node 101 requesting the server B node 102 for an auxiliary service includes a header field 411, long data assigning information field 143, function assigning information field 413, and field 414 for the other information. As the information for the destination of the message, information which indirectly assigns a message queue may be used.

The header field 411 contains information indicating to which program this message 141 is to be sent, which program sent this message, and other information needed for communication.

The contents of the long data assigning information field 143 include a similar configuration and contents to the long data assigning information 123 in the message 121 (FIG. 3). The function assigning information field 413 contains information which describes the contents of the auxiliary service to be requested.

Figure 5:
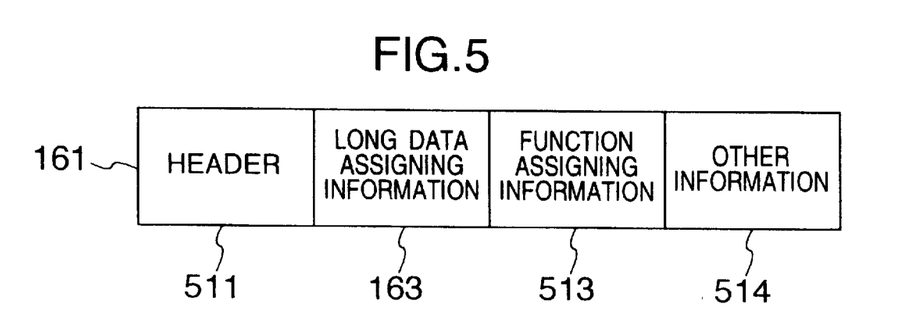
FIG. 5 is a diagram showing a structure of a long data request message.

FIG. 5 shows the contents of the message 161 in one embodiment of the present invention.

The message 161 from the server B node 102 requesting the application node 100 for a transmission of long data includes a header field 511, long data assigning information field 163, function assigning information field 513, and field 514 for the other information.

The header field 511 contains information indicating to which program this message 161 is to be sent, which program sent this message, and other information needed for communication.

To which program this message should be sent can be known from the receiver assigning information 322 of the long data assigning information field 143 of the message 141, and it is possible to assign in the header field 511.

The contents of the long data assigning information field 163 include a similar configuration and contents to the long data assigning information 123 in the message 121. However, since the information corresponding to the receiver assigning information 322 is used in the header field 511, it is possible to omit from the long data assigning information 163.

The function assigning information field 513 includes information which indicates that the function assigning information field is a fetch request message.

In the application node 100, the long data 122 is held until the fetch request of the long data 122 is received. Accordingly, in the case where the fetch request message 161 of the long data 122 is not transmitted to the application node 100 due to the fact that the server A node 101 is encountered with any trouble, or the auxiliary service to the server B node 102 becomes unnecessary, it is necessary to give an opportunity of the release in another form.

In such a case, a message similar to the long data fetch request message 161 is sent to the application node 100 from the server A node 101. The message is likewise received by the receiving context 220 of the long data fetch message.

In the function assigning information field 513 of the message 161 sent to the application node 100 from the server B node 102, there is stored information which indicates that the transmission of the long data 122 is not necessary. In step 222, the necessity of the transmission of the long data 122 is decided from the information 513, and if the transmission is not necessary, only the release processing for the preservation control of the long data 122 is executed.

The foregoing description is an embodiment of the case where the server A node 101 requested only the server B node 102 for the auxiliary service for the long data 122.

Next, an embodiment will be described in the case where the server A node 101 requests a plurality of servers for the auxiliary service.

In one simple method, when the request for the auxiliary service is to be made to a plurality of servers, the fetch request message 161 of the long data 122 is sent to the application node 100 from the server A node 101 so that the long data 122 is transmitted to the server A node 101 from the application node 100, and when the request for the auxiliary service is made to another server, it is configured in that the long data is sent from the server A node 101 to the another server. However, in this method, it is impossible to obtain the meritorious effect of the present invention.

If it has been known in advance that the server A node makes a request for the auxiliary service to, for example, two servers, it is only necessary for the application node 100 to wait for the fetch request message by two times unconditionally in the context 200.

However, it is desirable that the program operating on the application node 100 is independent of the processing and configuration in the server A node 101.

Figure 6:
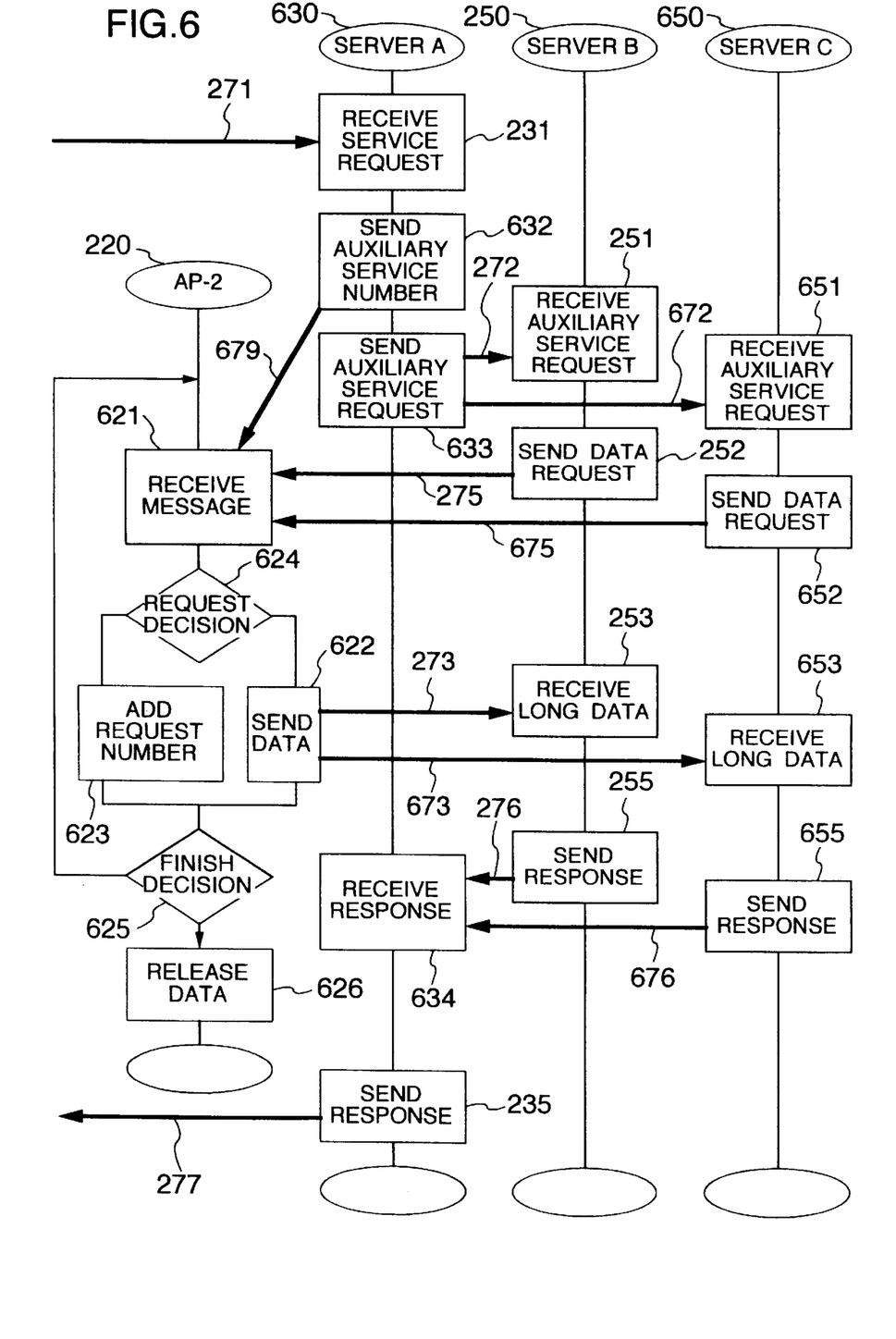
FIG. 6 is a flow chart for explaining a second embodiment of a transfer processing of long data.

FIG. 6 is a flow chart for explaining another embodiment of the present invention which solves the above-mentioned problem.

In step 231, when a service request message sent from the application node 100 is received, the server A in step 632 obtains the number of servers which execute the requested auxiliary service, prepares a message informing of the number of servers which execute the auxiliary service, and sends the message to the application node 100.

The contents of this message have a similar structure to the message 161, and contain other than the field assigning the long data 122, the function assigning field 513 which stores information assigning that the message is a message informing of a predetermined number of requests for the long data.

Also, in this message, the field 514 for other information stores information of the number of requests for auxiliary service. The arrow 679 indicates the delivery of this message.

In the context 220 of the application node 100, in step 621, the message 679 mentioned above is received.

In the step 621, since the long data fetch request message is also received, in step 624, the request function of the received message is decided by using the function assigning field 513 of the message 161.

As a result of the decision, if the received message is decided to be the long data fetch request message, proceeds to step 622 described later. Furthermore, if the received message is decided to be the informing message of the number of requests for the auxiliary service, proceeds to step 623.

In step 623, the number of requests informed by the received message is added to the predetermined number of times of transmission of the long data.

Furthermore, a response message to the above-mentioned received massage is sent to the server A.

Subsequently, in step 625, the predetermined number of times of transmission of the long data is checked, and if the value is positive, returns to step 621. Accordingly, at the time of receiving the informing message of the number of requests, the processing certainly returns to step 621. Regarding the opportunity at which the predetermined number of times of transmission of the long data is subtracted will be described in detail later.

In a processing 630 in the server A, in step 632, the response message mentioned above is received, and when it is confirmed that the message has been processed, in step 633, a message is sent to a plurality of nodes of servers which execute the auxiliary service. Here, it is supposed that the server B and server C are requested for the auxiliary service.

The processing in the server B is shown in a processing flow 250, and the processing in the server C is shown in a processing flow 650.

The messages sent to the servers B and C have a similar structure to that of the message 141, and the contents of the service requested to each auxiliary server are clearly indicated in the function assigning field 413 of the message which is prepared for each auxiliary server.

As the function which is assigned may include such a service, for example, in the server B and server C, different databases are respectively searched by using the long data 122. These data passings are represented by the arrows 272 and 672.

The processings in the server B and server C are similar to that described in the foregoing. The steps 651, 652, 653, and 655 are respectively similar to steps 251, 252, 253, and 255 in FIG. 2.

In step 252, or 652, when the fetch request message of the long data 122 is sent, it is received in step 621, and depending on the result of decision of the request function in step 624, the processing proceeds to step 622 as described in the foregoing.

In step 622, in response to the request, the long data 122 is sent to the server B, or server C, and "1" is reduced from the predetermined number of times of transmission of the long data.

Subsequently, in step 625, the predetermined number of times of transmission of the long data is checked. The number of times is indicating the remaining predetermined number of times of transmission of the long data, and if the value is positive, returns to step 621 as described in the foregoing. If the value is not positive, the transmission of the long data is completely finished, and thus, proceeds to step 626.

In step 626, the preservation control of the long data is released.

In step 634, a response message from the server B and server C is waited for, and in step 235, a response message is sent to the application node 100.

In the server B node, it is also considered that still another server is requested for the associated processing by the server B node. In this case, in the server B node, it is only needed that a similar processing to step 632 is executed, and a request for updating the predetermined number of times of transmission of the long data is made to the application node 100.

In step 623, since the predetermined number of times of transmission informed by step 632 is added, the predetermined number of times of transmission of the long data is correctly updated.

Likewise, by sending a negative number to the application node 100 from the server A node 101 as the predetermined number of times of transmission of the long data, it is possible to inform of the interruption of the predetermined fetching of the long data.

Furthermore, by providing a communication means to the server B or server C to connect the server B or server C to a different network, and by sending the long data received by the server B or server C to another server or another node, it is possible to request the another server or the another node for the processing of the long data.

Furthermore, the server B or server C may be formed as a server having a database access function so that the server B or server C is capable of accessing a data base by using received data or a part of the data.

In the present invention, the long data is sent to only the server node which actually uses the long data, and the transmission of the long data to an intermediate server node which mediates a service request can be eliminated. Accordingly, the overhead due to the transmission of the long data can be reduced. By virtue of this, the processing time required for the service can be reduced, and also the load on the network can be decreased.

Furthermore, a server node actually processing long data can know the length of the long data before the server node actually receives the data. Therefore, appropriate job scheduling can be performed.

We claim:

1. A method of data passing in a computer system including a communication network, and at least three processing systems connected to the communication network, wherein a first processing system requests a third processing system through a second processing system for a processing of data existing in said first processing system, said method comprising the steps of:

preparing, in said first processing system, a first message containing information for assigning said data, and sending the first message to said second processing system;

preparing, in said second processing system, a second message containing information for assigning said data in order to request said third processing system for an associated processing of said data, and sending the second message to said third processing system;

preparing, in said third processing system, a third message containing information for assigning said data or a part of said data, on the basis of the second message sent from said second processing system, and sending the third message to said first processing system; and transferring, in said first processing system on the basis of the third message sent from said third processing system, said data or a part of said data assigned in the third message to said third processing system.

2. A method of data passing according to claim 1, wherein said first processing system receives the third message from said third processing system by a context different from a context by which the first message is sent to said second processing system, and transmits said data to said third processing system.

3. A method of data passing according to claim 2, wherein an operating system of said first processing system receives the third message from said third processing system, and transmits said data to said third processing system.

4. A method of data passing according to claim 1, wherein the information in the first message, which assigns said data includes information for assigning said first processing system.

5. A method of data passing according to claim 1, wherein the information in the first message, which assigns said data includes information for assigning said third processing system which makes a request for transmission of said data.

6. A method of data passing according to claim 1, wherein the information in the third message, which assigns said data includes an identifier of a message queue corresponding to said third processing system.

7. A method of data passing according to claim 1, wherein said third processing system stores said data in storing means of said third processing system.

8. A method of data passing according to claim 1, wherein said third processing system transmits said data to a second network different from said network by using communication means.

9. A method of data passing according to claim 1, wherein said third processing system executes a processing by using said data or a part of said data transferred thereto, and by using a database of said third processing system.

10. A method of data passing according to claim 1, wherein said third processing system is a server which executes a processing of said data transferred from said first processing system.

11. A method of data passing in a computer system including a communication network, and at least four processing systems connected to the communication network, wherein a first processing system requests third and fourth processing systems through a second processing system for a processing of data existing in said first processing system, said method comprising the steps of:

preparing, in said first processing system, a first message containing information for assigning said data, and sending the first message to said second processing system;

placing, in said first processing system, said data in a preserved state;

preparing, in said second processing system, a second message informing of the number of processing systems which are requested for an associated processing of said data, and sending the second message to said first processing system;

preserving, in said first processing system, the number of processing systems which execute the associated processing, on the basis of the second message sent from said second processing system;

preparing, in said second processing system, third and fourth messages containing information for assigning said data in order to request said third and fourth processing systems for the associated processing of said data, and sending the third and fourth messages respectively to said third and fourth processing systems;

preparing, in said third and fourth processing systems, fifth and sixth messages containing information for assigning said data or a part of said data on the basis of the third and fourth messages sent from said second processing system, and sending the fifth and sixth messages to said first processing system respectively from said third and fourth processing systems;

transferring, in said first processing system in response to the fifth and sixth messages, said data or a part of said data assigned in the fifth and sixth messages to said third and fourth processing systems;

deciding, in said first processing system, whether to send said data or not in response to the messages from said third and fourth processing systems requesting for said data, on the basis of the number of processing systems executing said associated processing preserved in said first processing system; and interrupting, in said first processing system, the preservation of said data when it is decided not to send said data.

12. A method of data passing according to claim 11, wherein said first processing system receives the data request message by an operating system, and sends said data to said third processing system.

* * * * *